United States Patent [19]

Harashima

[11] Patent Number: 5,333,244
[45] Date of Patent: Jul. 26, 1994

[54] METHOD OF AND SYSTEM FOR DISPLAYING A SCALAR QUANTITY DISTRIBUTION

[75] Inventor: Ichiro Harashima, Hitachi, Japan

[73] Assignee: Hitachi, Ltd., Tokyo, Japan

[21] Appl. No.: 799,187

[22] Filed: Nov. 27, 1991

[30] Foreign Application Priority Data

Nov. 29, 1990 [JP] Japan ................. 2-332741

[51] Int. Cl.$^5$ ................................ G06F 15/62
[52] U.S. Cl. ........................ 395/119; 395/120; 364/413.16
[58] Field of Search ............... 395/119, 120, 124–127, 395/133, 135; 364/413.16, 474.26

[56] References Cited

U.S. PATENT DOCUMENTS

| | | | |
|---|---|---|---|
| 4,135,247 | 1/1979 | Gordon et al. | 364/413.16 |
| 4,719,585 | 1/1988 | Cline et al. | 395/126 X |
| 4,725,960 | 2/1988 | Shima et al. | 364/474.26 |
| 4,835,712 | 5/1989 | Drebin et al. | 395/124 |
| 4,914,589 | 4/1990 | Crawford | 395/124 X |
| 5,022,085 | 6/1991 | Cok | 395/135 X |
| 5,101,475 | 3/1992 | Kaufman et al. | 395/127 X |

Primary Examiner—Heather R. Herndon
Assistant Examiner—Almis Jankus
Attorney, Agent, or Firm—Antonelli, Terry, Stout & Kraus

[57] ABSTRACT

A scalar quantity distribution displaying method wherein shape information of an object to be displayed having a certain shape, and magnitudes of scalar quantities at sampling points lying on the object to be displayed are used for displaying scalar quantity magnitude distribution on the object to be displayed in terms of contour lines and/or a color map; the improvement therein comprising the fact that the distribution of the magnitudes of the scalar quantities is displayed by a graph simultaneously with the display presented in terms of the contour lines and/or the color map. Since the scalar quantity distribution is concurrently displayed, any singular value, etc. of the scalar quantity can be readily acknowledged.

9 Claims, 6 Drawing Sheets

METHOD OF AND SYSTEM FOR DISPLAYING A SCALAR QUANTITY DISTRIBUTION

BACKGROUND OF THE INVENTION

1. Field of the Invention

The present invention relates to a method of, and a system for, displaying the distribution of the magnitudes of a scalar quantity. By way of example, the scalar quantity distributions include analytical results obtained using computers, such as the results of structural analyses and other scientific and technological computations, the analyzed results of meteorologic data and geographic data sent from artificial satellites, and the analyzed results of data obtained with measuring instruments in the fields of engineering, physics, chemistry, medical science etc.

2. Description of the Related Art

A method wherein, in regard to an object to be displayed having a certain shape, a scalar quantity distribution, which is a result analyzed with a computer, is displayed in terms of contour lines or a color map, and is common in the CAE (Computer Aided Engineering) field.

In the computer aided analysis, the structure of the object is expressed by meshes, and the magnitudes of the scalar quantity having been analytically obtained at the positions of such constituents of the meshes as planes, lines and nodes are bestowed as the attribute values of the constituents. The distributional situation of the magnitudes of the scalar quantity on the meshes is displayed by the use of the contour lines or the color map.

Meanwhile, in a case where the data items of a physical quantity, such as temperature or the intensity of an electromagnetic wave, measured by a measuring apparatus are to be displayed in colors, it is common practice that the data items of the physical quantity are classified into several levels, and that the data items existing at the individual levels are substituted by color tones held in correspondence with the respective levels beforehand. Thus, the data items are color displayed in the pixel unit of a screen.

In this case, however, dividing the distributional range of the scalar quantity for the line display or the color display becomes a problem. Heretofore, the color map display has been generally presented by first finding the maximum value and minimum value of the scalar quantity analytically obtained and then equally dividing the corresponding interval by the number of the display colors of the color map.

By way of example, in the case of the color map display of the result of a structural analysis in the CAE, the magnitudes of the scalar quantity bestowed as the attribute values on the nodes of the meshes expressing the structure of the object to-be-analyzed are held in correspondence with the respective display colors of a color bar, the parts of the object between the nodes are displayed in terms of the contour lines by utilizing the linear interpolation, and the parts between the contour lines are expressed in the corresponding display colors of the color bar.

Incidentally, in the body of this specification and the statements of the appended claims, the word "color" shall cover, not only a chromatic color such as red or blue, but also an achromatic color such as white or black.

Besides, the expression "color map" shall cover, not only a display in "color", but also a gradation display such as a display in various gradations of grey.

Referring back to the prior art method, the interval defined by the maximum value and minimum value of all the magnitudes of the scalar quantity is equally divided. Therefore, if the scalar quantity has any singular value which is widely different from the tendency of the whole distribution, the singular value has an effect on the maximum or minimum value and spreads the full interval. Accordingly, in the contour line display, the contour lines become dense at the part of the object exhibiting the singular value and become sparse at the other parts. Consequently, the part which does not exhibit the singular value cannot be displayed in detail.

Moreover, in a case where a plurality of analyzed results are to be compared in terms of color maps, the above method cannot make an absolute comparison based on display colors because the display colors corresponding to the magnitudes of the scalar quantity are relatively determined for each of the analyzed results.

Meanwhile, in "INTERFACE", August 1990, pp. 221-232, a paper entitled "Image Processing of Data from Artificial Satellite" has introduced a method wherein, in order to express the distribution of image data sent from an artificial satellite, the respective level values are counted, and a histogram is displayed with the level values taken on the axis of abscissas and the number of times taken on the axis of ordinates. This method, however, cannot simultaneously display the histogram and a map and is problematic in operability and ease of data acknowledgement.

SUMMARY OF THE INVENTION

An object of the present invention is to provide a method of, and a system for, displaying a scalar quantity distribution, in which even a part which is not exhibiting any singular value can be displayed in detail, and an absolute comparison can be made based on display colors, to thereby facilitate the analysis of data and realizing a high degree of operability.

In one aspect of performance of the present invention for accomplishing the above object, there is provided a scalar quantity distribution displaying method wherein shape information of an object to be displayed having a certain shape and magnitudes of a scalar quantity at sampling points lying on the object to-be displayed are used for displaying a distribution of the magnitudes of the scalar quantity on the object to be displayed in terms of contour lines and/or a color map; characterized in that the distribution of the magnitudes of the scalar quantity is displayed by a graph simultaneously with or before the display is presented in terms of the contour lines and/or the color map.

In this case, said graph should preferably be a histogram over a range which covers said magnitudes of said scalar quantity at all said sampling points.

It is also allowed that an arbitrary interval of said histogram is designated, that the designated interval is re-divided, and that a histogram for said magnitudes of said scalar quantity within said designated interval is displayed.

Herein, boundary values of said intervals obtained by said re-division should preferably be alterable. Also, it is allowed to perform said division so that said distribution of said magnitudes of said scalar quantity may become a predetermined distribution.

Further, corresponding intervals of said histogram and said contour lines and/or said color map should preferably have the same display colors.

In another aspect of the present invention, there is provided a scalar quantity distribution displaying method wherein shape information of an object to be displayed having a certain shape, and magnitudes of a scalar quantity at sampling points lying on the object to-be displayed are used for displaying a distribution of the magnitudes of the scalar quantity on the object to be displayed in terms of contour lines and/or a color map; characterized in that display condition information for stipulating a display aspect is stored and is used for presenting the display.

In this case, said display condition information should preferably be information which concerns divisions of intervals and/or display colors.

Further, the present invention may redepict said contour lines and/or said color map already under display, on the basis of said display condition information.

Besides, the color maps etc. should preferably be able to simultaneously display the magnitudes of said scalar quantity in a plurality of series.

In still another aspect of performance, there is provided a scalar quantity distribution displaying system, characterized by comprising map display means for displaying contour lines and/or a color map on the basis of shape information of an object to be displayed having a certain shape, and magnitudes of a scalar quantity at sampling points lying on the object to be displayed; graph display means for displaying a graph on the basis of said magnitudes of said scalar quantity; and control means for controlling said graph display means and said map display means so as to display said contour lines and/or said color map, corresponding to said graph.

In this case, said graph should preferably be a histogram. Also, it is allowed that the scalar quantity distribution displaying system further comprises interval designation means for designating an arbitrary interval of said histogram, wherein said control means has a function of controlling said graph display means so as to display a histogram for only said interval designated by said interval designation means.

Besides, the scalar quantity distribution displaying system should preferably further comprise memory means for storing display condition information for stipulating a display aspect, wherein said graph display means and said map display means present the display on the basis of said display condition information stored in said memory means.

The above aspect of performance will be described more specifically. Said interval designation means is an intragraphic interval designation means for designating said arbitrary interval of said scalar quantity on said graph displayed on a display device, by the use of, for example, a pointing device such as a mouse.

In addition, said control means operates as map display alteration means for controlling, for example, said map display means, said graph display means and said interval designation means so as to alter the displayed distribution of said contour lines and/or said color map.

Besides, said memory means includes, not only a storage medium, but also display condition information write means for recording said display condition information, for example, color information in a file or the like and display condition information read means for fetching said information from said file.

The method and system of the present invention constructed as thus far described, are operated as follows:

The histogram is displayed over the range which covers the magnitudes of the scalar quantities at all the sampling points. After the existence of any singular value or the like has been acknowledged by viewing the graph, the distribution of the magnitudes of the scalar quantity on the object to be displayed is displayed in terms of the contour lines and/or the color map, using the shape information and the magnitudes of the scalar quantity at the sampling points. In this case, the colors of the individual intervals are made the same as those of the histogram.

Incidentally, when the arbitrary interval is designated in the display of the histogram, the designated interval is re-divided. Subsequently, the histogram is displayed again for the new divisional intervals. Thus, the arbitrary interval can be viewed in detail.

On this occasion, any desired distribution can be displayed by altering the boundary value of the new divisional intervals. Besides, the interval may well be divided so as to establish a predetermined distribution, for example, the Gaussian distribution.

In the different aspect of performance, the items of the display condition information for stipulating the display aspects, for example, the information items on the divisions of the intervals and the display colors, are stored and are utilized, whereby the display of the contour lines and/or the color map are presented under predetermined display conditions.

The practicable states of the above operations will now be described.

The distribution of the magnitudes of the scalar quantity on the certain shape is graphically displayed before or simultaneously with the contour line display and/or the color map display. Thus, any pure numerical distributional value, which is independent of the shape and which has been difficult to grasp merely with the contour line display and/or the color map display, can be expressed by the graph display. Accordingly, a user can readily grasp the distributional situation of the scalar quantity, namely, if the scalar quantity distribution is continuous, if a singular value exists, etc.

Moreover, the graph display means, intragraphic interval designation means and map display means are interlocked under the control of the map display alteration means. The arbitrary interval within an area displayed as the graph, that is the distribution of the display in terms of the contour lines and/or the color map, is designated by the intragraphic interval designation means, for example, the mouse, whereby those intervals in the graph of the distribution of the magnitudes of the scalar quantity which correspond to the designated interval can be displayed in more detail in terms of the contour lines and/or the color map.

Thus, in a case where the user has found out the interval containing the singular value in the graph, he/she is permitted to easily exclude the singular value from the object which is to be displayed in terms of the contour lines and/or the color map, by designating the intervals other than the singular value interval.

Furthermore, when the contour line display and/or the color map display are presented, the display condition information is stored by the use of the memory means configured of the display condition information write means, etc. Thereafter, in displaying another object, the display conditions such as the colors of the respectively corresponding intervals can be rendered the same by utilizing the display condition information.

Accordingly, the user is permitted to make the absolute comparison of the scalar quantity magnitudes of the plurality of objects to be displayed on the basis of the display colors.

DETAILED DESCRIPTION OF THE PREFERRED EMBODIMENTS

An embodiment of the present invention will be described in conjunction with the drawings.

Figure 11:
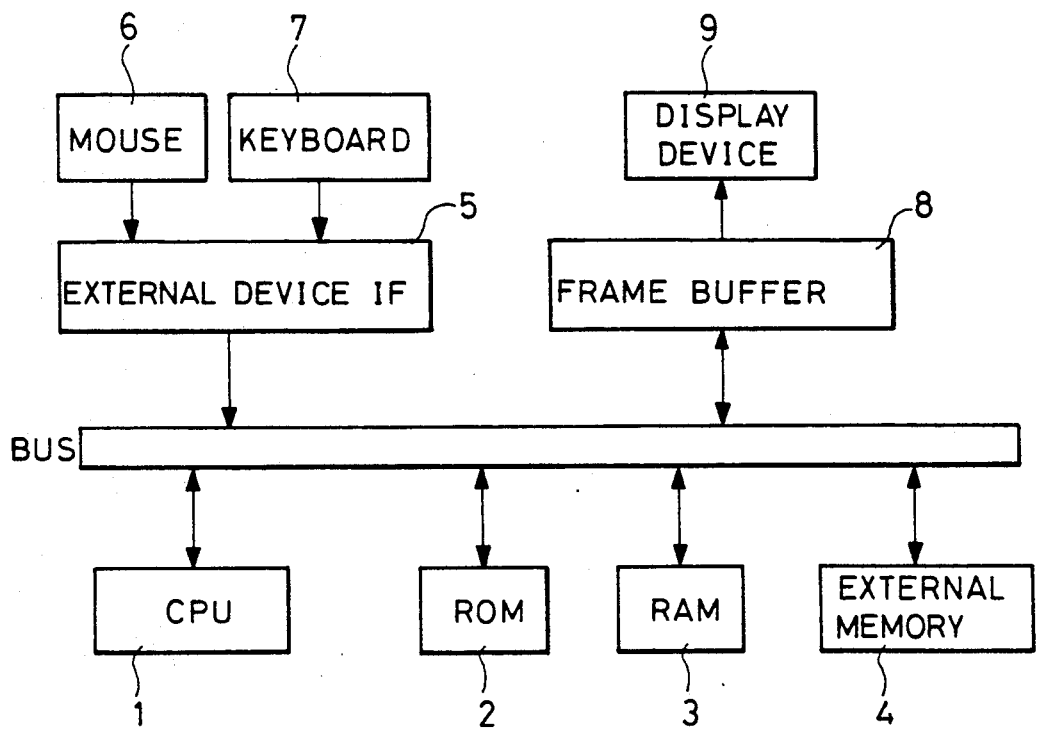
FIG. 11 is a diagram showing the basic construction of the displaying system.

The basic construction of a scalar quantity distribution displaying system in this embodiment is illustrated in FIG. 11.

The scalar quantity distribution displaying system is similar to a conventional information processing system as regards the hardware. More specifically, a CPU 1 for executing various operations; a ROM 2, a RAM 3 and an external memory 4 for storing programs and data; a mouse 6 and a keyboard 7 being input means; and a display device 9 are interconnected through a bus. Incidentally, the mouse 6 and the keyboard 7 are connected with the bus through an external device interface 5. Also, the display device 9 is connected through a frame buffer 8.

The functions of this embodiment as the scalar quantity distribution displaying system are attained in such a way that the CPU 1 runs the programs stored in the memories such as the ROM 2. Therefore, the functions which are achieved by the program runs shall be explained below.

Figure 1:
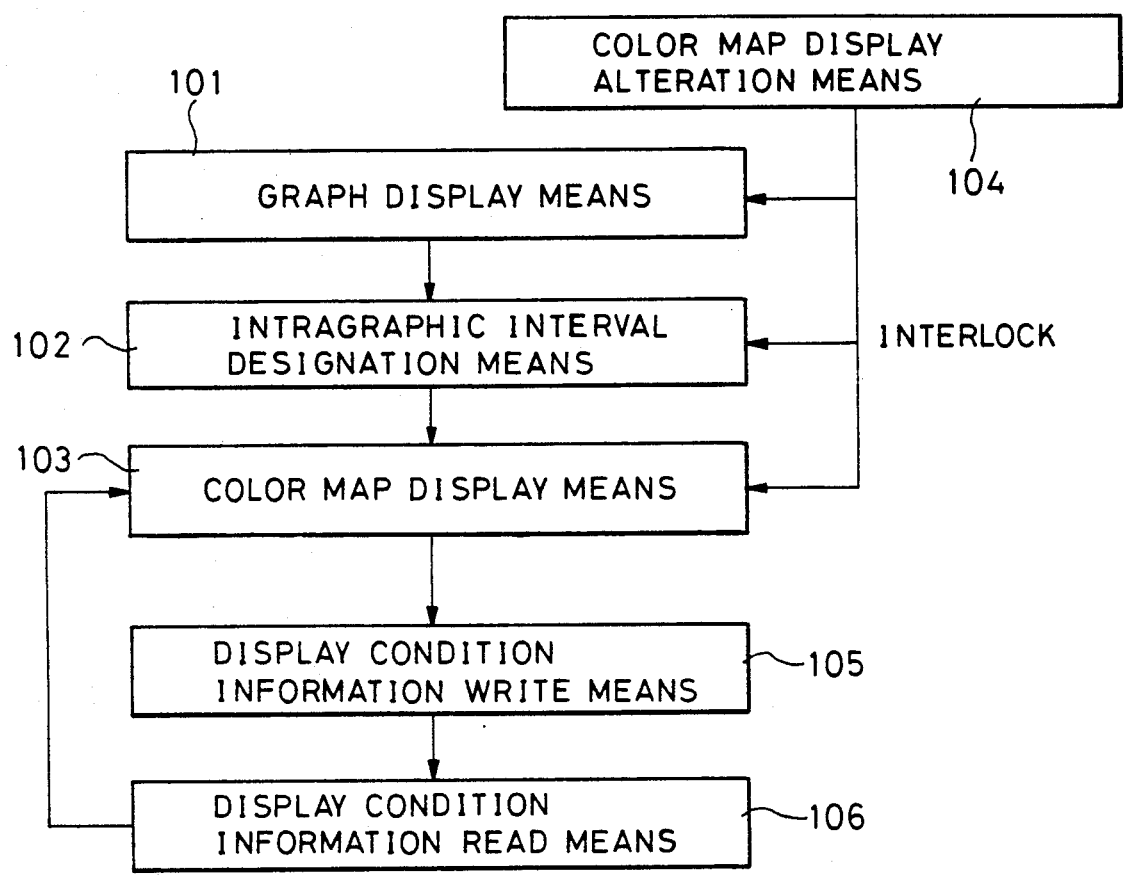
FIG. 1 is an explanatory diagram showing the construction of a scalar quantity distribution displaying system in an embodiment of the present invention.

As shown in FIG. 1, the scalar quantity distribution displaying system of this embodiment is functionally constructed of color map display alteration means 104 being control means, graph display means 101 for displaying a histogram, color map display means 103 for displaying a color map, intragraphic interval designation means 102 including a pointing device such as the mouse 6 in FIG. 11, means 105 for writing display condition information to be stored in, e.g., the RAM 3, and means 106 for reading out the display condition information.

Images in this embodiment are displayed by the display device 9 in FIG. 11, for example, a CRT.

Now, display examples will be described in relation to a case where this embodiment is applied to the display of the stress analysis of a computer-aided structural design.

Figure 2A:
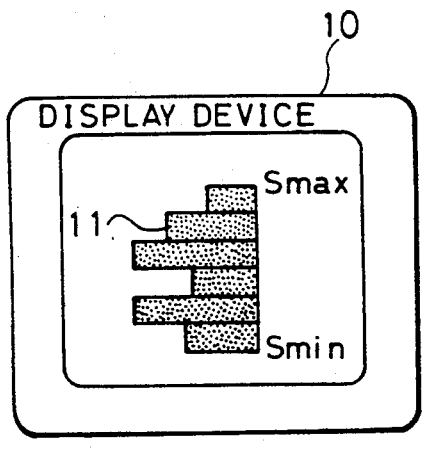
FIGS. 2(a) and 2(b) are diagrams of frames on a screen for explaining the display example of a histogram.

In the example shown in FIG. 2(a), a result analyzed by a computer, that is, the magnitudes of a scalar quantity which is a stress herein, is displayed as a histogram 11 on a display device 10 by the graph display means 101. Thus, whether or not the analyzed result has actual values can be checked.

Figure 2B:
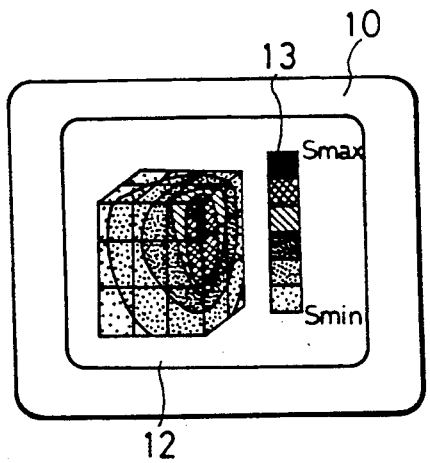

If an actual stress distribution has been acknowledged in view of the histogram 11, the stress distribution of the analytical result is displayed as a color map 12 in superposition on a wire frame as shown in FIG. 2(b), by the color map display means 103.

Here, the "actual" stress distribution is intended to mean a continuous distribution which does not have any singular stress widely different from the tendency of the whole stress distribution. By the way, the singular stress can occur due to the analyzing algorithm or the performance of the computer.

Figure 3:
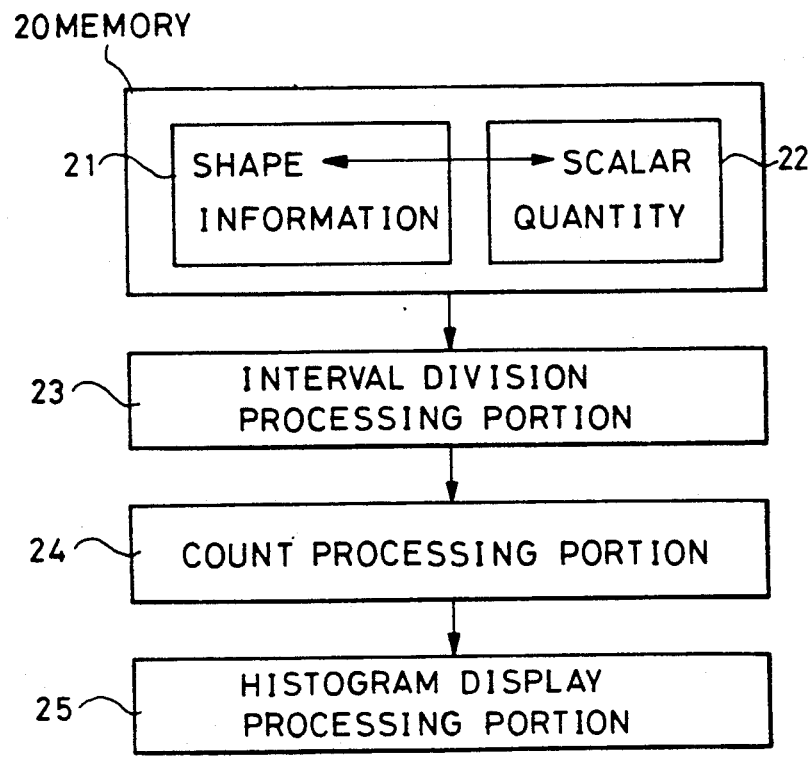
FIG. 3 is a flow chart of processing for displaying the histogram shown in FIG. 2(a)

FIG. 3 is a flow chart of processing which the graph display means 101 executes for displaying a scalar quantity distribution as a histogram.

The graph display means 101 keeps shape information items 21 and corresponding scalar quantity magnitudes 22 stored in a memory 20 in one-to-one correspondence.

Incidentally, the shape information items 21 are the IDs (identifiers) of the shape elements of the shape of an object to be analyzed, for example, the IDs of the nodes of meshes constituting the shape.

Herein, with regard to the stored data, an interval division processing portion 23 finds the maximum value Smax and minimum value Smin of the scalar quantity magnitudes corresponding to all of the shape elements, and it equally divides the interval between the maximum and minimum value, by a preset dividing number. Subsequently, a count processing portion 24 counts the number of those shape elements existent within the interval which possess the scalar quantity 22 as an attribute, every divisional subinterval. A result thus obtained is displayed in the form of the histogram by a histogram display processing portion 25.

In this way, before the contour line display or the color map display is actually presented, the histogram which expresses the distribution situation of the magnitudes of the scalar quantity can be checked, and it can be judged if the analytical result is valid and appropriate.

Figures 4A, 4B:
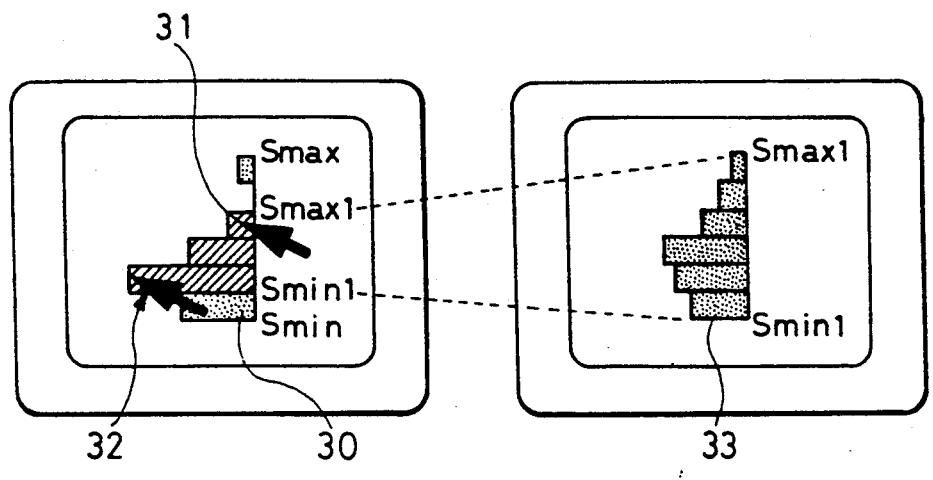
FIGS. 4(a) and 4(b) are diagrams of display frames in the case of designating that range within the display area of a histogram which is to be displayed in detail.

The display example shown in FIGS. 4(a) and 4(b) elucidates an operation in which the graph display means 101, intragraphic interval designation means 102 and color map display means 103 are interlocked under the control of the color map display alteration means 104.

Owing to the interlocking operation, when one or more points of one or more arbitrary intervals are designated in a histogram expressive of the scalar quantity distribution of an analyzed result by the use of the intragraphic interval designation means 102, herein the pointing device such as mouse, the scalar quantity distribution corresponding to the designated interval(s) is displayed as a detailed color map by the color map display alteration means 104.

This display processing will be described in more detail.

Referring to FIG. 4(a), the left button of the mouse is clicked once within the area of the histogram 30 displayed by the graph display means 101 (the position of a mouse cursor on this occasion is indicated by a mouse cursor 31). Then, the designation of the interval is started. Subsequently, the right button of the mouse is clicked once (the position of the mouse cursor on this occasion is indicated by a mouse cursor 32). Then, the designation of the interval is completed.

Next, the maximum value Smax 1 and minimum value Smin 1 of the designated interval are derived, and this interval is equally divided again by a preset dividing number (the number of display colors), as seen from FIG. 4(b). Besides, the number of those shape elements existent in each subinterval which have the scalar quantity as an attribute is counted. A result thus obtained is redisplayed as a new histogram 33.

Moreover, a more detailed contour-line display or color-map display can be presented by repeating the above processing in a range in which the shape elements being a display alternative are existent.

Now, the example in which a histogram and the color bar of a color map are correspondingly displayed in the same frame will be described with reference to FIG. 3.

The color bar 41 and the histogram 42 are simultaneously displayed in a parallel arrangement on the frame 40 by the color map display means 103 as well as the graph display means 101. Further, the respective intervals of the histogram 42 are displayed in the same colors as the corresponding colors of the color bar 41.

In this way, the proportions of the areas or volumes of parts which occupy the individual colors in the color map 43 can be expressed by the histogram 42, and the quantity of information which appeals to the eye increases. Moreover, it is easier to judge the contents of the information items.

Figure 5:
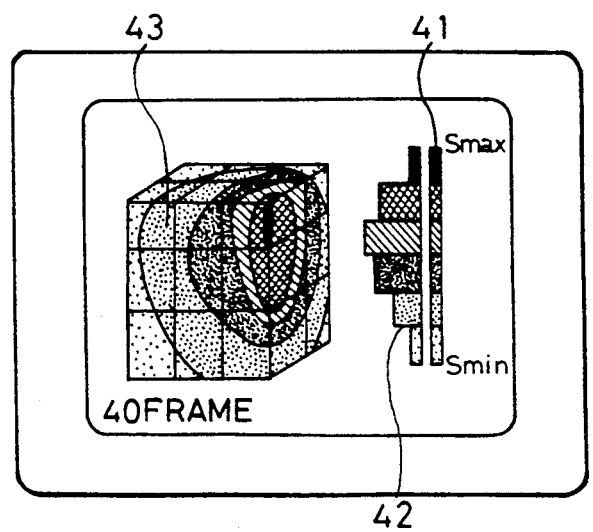
FIG. 5 is a diagram of a display frame showing an example in which the histogram and a color bar are displayed in the same frame.
Figure 6A:
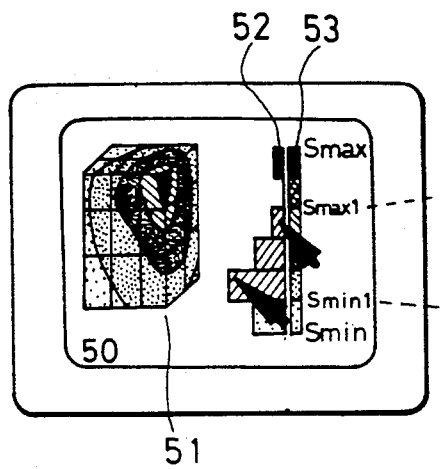
FIGS. 6(a) and 6(b) are diagrams of display frames in the case of displaying only part of the example in FIG. 5 in detail.
Figure 6B:
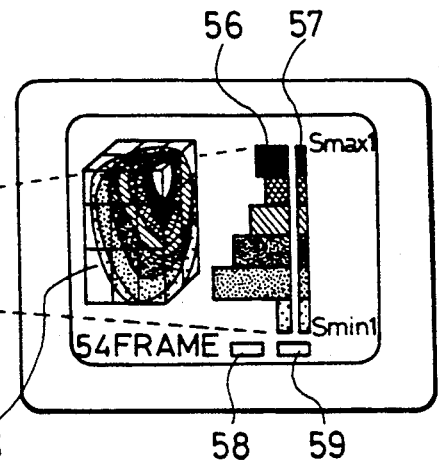

FIGS. 6(a) and 6(b) illustrate the example in which the same display as in FIG. 5 is presented by interlocking the graph display means 101, intragraphic interval designation means 102 and color map display means 103 under the control of the color map display alteration means 104, and in which also the arbitrary interval of the histogram in the display is designated using the pointing device such as a mouse, whereby a scalar quantity distribution corresponding to the interval is displayed as a color map in detail.

In this way, the method of designating the interval by the use of the mouse is the same as in the case of FIGS. 4(a) and 4(b).

Further, in this example, display conditions etc. at individual stages can be stored and fetched by the display condition information write means 105 and the display condition information read means 106, respectively. As seen from FIG. 6(b), buttons 58 and 59 for actuating the means 105 and 106 are displayed within a frame 54.

Accordingly, even after the color map 55 has been displayed through several detailing operations, the display condition information kept stored can be fetched by clicking the button 58 for "Previous State" or the button 59 for "Initial State" which is displayed in the frame 54. In this manner, a color map 51 last displayed as shown in FIG. 6(a) or a color map initially displayed can be directly resumed on the basis of the display condition information.

Figure 7:
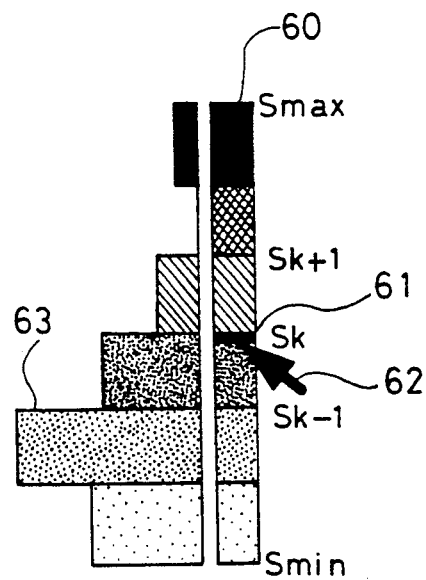
FIG. 7 shows a display frame in the case where the magnitude of a scalar quantity for the graduations of a color bar is changed.

FIG. 7 shows the example in which, as to a color bar 57 or a histogram 56 in FIG. 6(b), the magnitude of the scalar quantity for the graduations of the color bar is changed by dragging the boundary line of the intervals of the color bar with the mouse or clicking the mouse buttons in the corresponding intervals.

The magnitude Sk of the scalar quantity is changed in such a way that the boundary line 61 of the scalar quantity to be changed in the color bar 60 is picked and is vertically dragged by the intragraphic interval designation means 102, namely, the mouse.

By way of example, in a case where the boundary line 61 is dragged upwards, the scalar quantity magnitude Sk is incremented at preset step widths, that is, the scalar quantity magnitude Sk is enlarged. To the contrary, in a case where the boundary line 61 is decremented, the scalar quantity magnitude Sk is made smaller.

Also, in a case where the scalar quantity magnitude Sk is to be changed at smaller step widths, the incremental or decremental change is designated by dragging the boundary line 61 with the left button of the mouse, while at the same time, the right button is clicked, whereby the magnitude Sk can be incremented or decremented every preset step each time the right button is clicked once. However, the designation with the mouse or the like is not restricted to this method. For example, the magnitude Sk may well be continuously changed automatically while the right button is kept depressed.

Although the changeable range of the scalar quantity magnitude Sk is not especially restricted, it may well be set within upper and lower graduations Sk+1 and Sk−1 directly adjoining the boundary line 61, as follows:

$$Sk-1 < Sk < Sk+1$$

When the above operation has been performed, the color map display alteration means 104 interlocks the graph display means 101, intragraphic interval designation means 102 and color map display means 103 so as to recalculate the profile of the histogram 63, corresponding to the color bar 60, and to redepict the histogram. In this way, the scalar quantity magnitude Sk can be designated so as to display the histogram profile desired by the user.

By way of example, in a case where the color map is to be displayed with an even balance of all the display colors presented by the color bar, the graduations of the color bar can be readily changed so as to flatten the histogram profile.

Incidentally, only the numerical value of the scalar quantity magnitude Sk in the calculation of the profile is changed in this example. Accordingly, even after the change operation, the width of the display of each interval of the histogram is held equal to that displayed before the change operation. However, this aspect is not restrictive.

Figure 8:
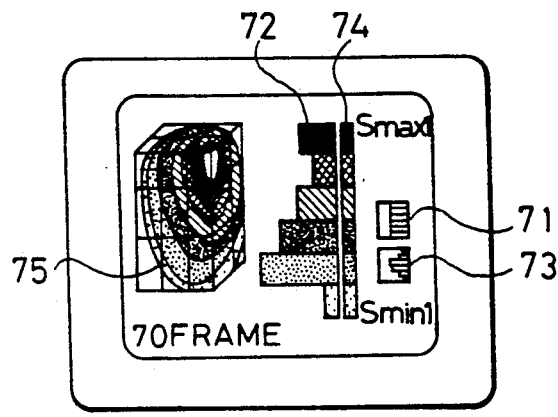
FIG. 8 shows a display frame in the case where the displaying system is endowed with the patterns of the distributions of histograms beforehand.

FIG. 8 shows the example in which the patterns of typical histogram profiles are prepared on the system side beforehand, and the user selects a desired one of the patterns. Thus, the scalar quantity is computed for divided intervals so as to display a histogram of the selected pattern and to display a corresponding color map.

A uniform distribution, the Gaussian distribution etc. are mentioned as examples of the histogram profiles which are prepared in advance.

In the illustrated example, the pattern is selected in such a way that either of buttons 71 and 73 provided in a frame 70 is selected by the mouse. By way of example, when the button 71 for "Uniform Distribution" is clicked, the scalar quantity magnitudes of the graduations of a color bar 74 are computed so as to uniformalize the histogram 72 and to display the corresponding color map 75. However, the distribution is not restrictive, but any other distribution may well be used. The method of the pattern selection is not restricted to the above, either.

Figure 9:
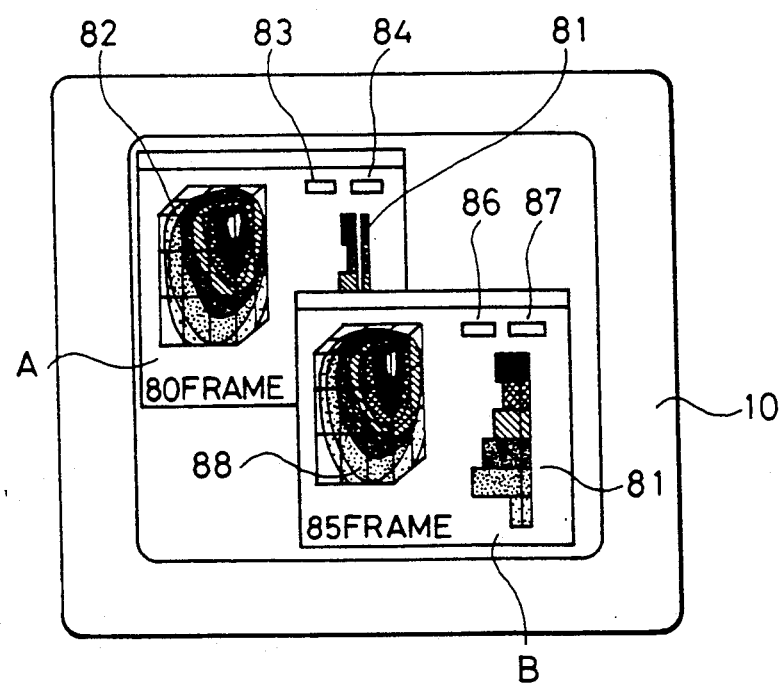
FIG. 9 shows a display frame in the case where a plurality of color maps are displayed in accordance with an identical color bar.

FIG. 9 shows the example in which the display condition information write means 105 and the display condition information read means 106 are utilized.

In the illustrated example, after the scalar quantity magnitudes of the graduations of a color bar have been designated as to a certain object for a color map display, the information items on the color bar, etc. are stored. Thus, in comparing the above object to be displayed with another object to be displayed by the use of color maps, the above color bar information is utilized for the comparison, thereby realizing the absolute comparison based on colors.

Figure 10A:
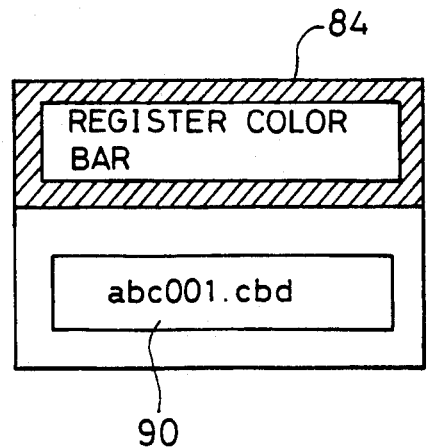
FIGS. 10(a) and 10(b) are diagrams for explaining display condition information write means and display condition information read means, respectively.

In this example, as to the object A displayed in a frame 80, the scalar quantity magnitudes of the graduations of the color bar 81 are designated by the foregoing method so as to display the color map 82. Thereafter, a button 84 for "Register Color Bar" set in the frame 80 is clicked by the mouse. Then, as shown in FIG. 10(a), a data file name input area 90 for registering the current color bar information is displayed. Therefore, a desired data file name is input to the area 90 through the keyboard (7 in FIG. 11), and the input operation is ended by depressing a "Return" key on the keyboard. Thus, the scalar quantity magnitudes of the graduations of the color bar 81 at the display of the object A are registered in a file.

Figure 10B:
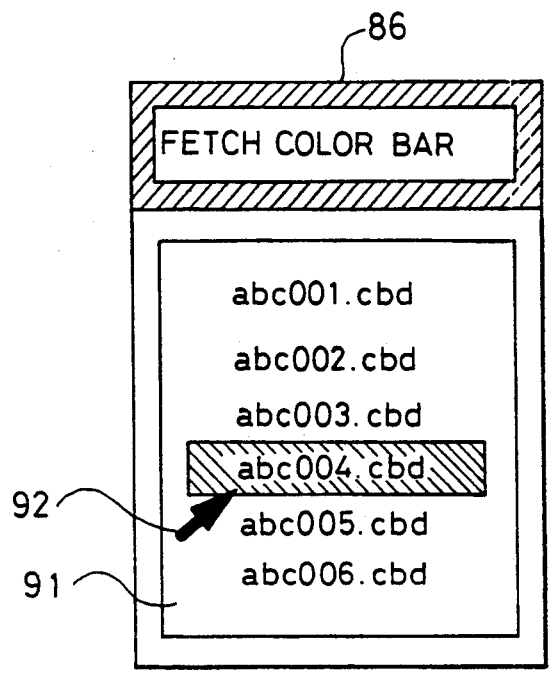

When the object to be displayed B, the color map of which is to be compared with that of the object A, is to be displayed in a frame 85, a button 86 for "Fetch Color Bar" set in the frame 85 is clicked. Then, as shown in FIG. 10(b), a data file name output area 91 appears, and the list of the names of the data files of color bar information items already registered is displayed. Therefore, the desired data file name is selected with a mouse cursor 92. Thus, the selected color bar information corresponding to the object B is fetched, and the color map 88 utilizing the fetched information is displayed. In this way, the absolute comparison based on the identical color bar 81 is realized for the two objects to-be-displayed, A and B.

By the way, in this example, the frames 80 and 85 are displayed as windows on the same display device 10, but they may well be simultaneously displayed on different display devices.

Although only the color maps have been referred to in this example, the expedient utilizing of the means 105 and 106 is similarly applicable to a contour line display and also to a three-dimensional display based another method.

By the present embodiment, it is easy to select whether or not a histogram is displayed.

As thus far described, in the embodiment, a histogram based on only scalar quantity magnitudes is displayed, so that a scalar quantity distribution is readily grasped. Accordingly, a singular value etc. can be easily acknowledged. Further, whether or not the singular value exists can be automatically judged in such a way that the distribution of the scalar quantity magnitudes in the histogram is compared with a predetermined pattern, for example, the Gaussian distribution.

Moreover, once only an interval to be acknowledged in detail can be designated and displayed, an analysis is facilitated. Besides, since the designation is done using a pointing device such as mouse, the necessary operation is easy.

Furthermore, conditions such as the display colors of the corresponding intervals of the histogram and a color map can be rendered the same by utilizing display condition information items stored. Therefore, the analysis of data is facilitated.

By the way, the embodiment has been described using only examples which display the graph as a histogram. However, this is not restrictive, and a different graph may well be displayed.

According to the present invention, effects as exemplified below can be achieved.

In displaying the magnitudes of a scalar quantity in terms of contour lines or a color map by the use of a computer, how the magnitudes of the scalar quantity are distributed can be grasped by conjointly employing the histogram display or the like of the scalar quantity distribution. Thus, the presence of the singular value of the scalar quantity, etc. which are often overlooked with only the color map display can be acknowledged with ease.

Further, in a case where the contour lines or the color map are to be displayed in detail, they can be partially displayed.

In addition, since display condition information designated in the color map display of the first analytical result can be utilized for the color map display of the next analytical result, the absolute comparison and study of the plurality of analytical results based on, e.g., colors are realized, and the efficiency of the analyzing job is enhanced.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

I claim:

1. A scalar quantity distribution displaying method wherein shape information of an object to be displayed having a certain shape, and magnitudes of scalar quantities at a plurality of sampling points lying on said object to be displayed are used for displaying scalar quantity magnitude distribution on said object to be displayed in terms of at least one of contour lines and a color map, said scalar quantity distribution displaying method comprising the the steps of:

storing display condition information for stipulating a display aspect, said display condition information concerning at least one of a plurality of divided intervals of said scalar quantities, display colors for said display and gradation levels for said display; and displaying said scalar quantity magnitude distribution.

2. A scalar quantity distribution displaying method as defined in claim 1, wherein said scalar quantity magnitudes in a plurality of series are simultaneously displayed.

3. In a scalar quantity distribution display method wherein shape information of an object to be displayed having a certain shape, and magnitudes of the scalar quantities at sampling points lying on the object to be displayed are used for displaying the distribution of the magnitudes of the scalar quantities on the objects to be displayed in terms of at least one of contour lines and a color map;

a scalar quantity distribution displaying method comprising the fact that display condition information for stipulating a display aspect is stored and is used for presenting the display, wherein said display condition information is information which concerns one of divisions of intervals of said scalar quantities, display colors for said display, and gradation levels for said display.

4. In a scalar quantity distribution display method wherein shape information of an object to be displayed having a certain shape, and magnitudes of the scalar quantities at sampling points lying on the object to be displayed are used for displaying the distribution of the magnitudes of the scalar quantities on the objects to be displayed in terms of at least one of contour lines and a color map;

a scalar quantity distribution displaying method comprising the fact that display condition information for stipulating a display aspect is stored and is used for presenting the display, wherein at least one of said contour lines and said color map already under display is redepicted on the basis of said display condition information.

5. In a scalar quantity distribution display method wherein shape information of an object to be displayed having a certain shape, and magnitudes of the scalar quantities at sampling points lying on the object to be displayed are used for displaying the distribution of the magnitudes of the scalar quantities on the objects to be displayed in terms of at least one of contour lines and a color map;

a scalar quantity distribution displaying method comprising the fact that display condition information for stipulating a display aspect is stored and is used for presenting the display, wherein the magnitudes of said scalar quantities in a plurality of series are simultaneously displayed.

6. A scalar quantity distribution displaying system, comprising:

map display means for displaying at least one of contour lines and a color map on the basis of shape information of an object to be displayed having a certain shape, and magnitudes of scalar quantities at sampling points lying on the object to be displayed;

graph display means for displaying a graph on the basis of said magnitudes of said scalar quantity;

control means for controlling said graph display means and said map display means so as to display at least one of said contour lines and said color map, corresponding to said graph; and interval designation means for designating an arbitrary interval of said histogram, wherein said control means has a function of controlling said graph display means so as to display a histogram for only said interval designated by said interval designation means.

7. A scalar quantity distribution displaying system, comprising:

map display means for displaying at least one of contour lines and a color map on the basis of shape information of an object to be displayed having a certain shape, and magnitudes of scalar quantities at sampling points lying on the object to be displayed;

graph display means for displaying a graph on the basis of said magnitudes of said scalar quantity;

control means for controlling said graph display means and said map display means so as to display at least one of said contour lines and said color map, corresponding to said graph; and memory means for storing display condition information for stipulating a display aspect, wherein said graph display means and said map display means present the display on the basis of said display condition information stored in said memory means.

8. A scalar quantity distribution display method wherein shape information of an object to be displayed having a certain shape, and scalar quantity magnitudes at a plurality of sampling points lying on said object to be displayed are used for displaying scalar quantity magnitude distribution on said object to be displayed in terms of at least one of contour lines and a color map, said scalar quantity distribution displaying method comprising the steps of:

displaying, in terms of at least one of contour lines and a color map, said scalar quantity magnitudes by a first histogram over a range which covers said scalar quantity magnitudes at all of said sampling points;

designating an arbitrary interval of said histogram;

dividing said designated interval into sub-intervals; and displaying, simultaneously with said first histogram, a second histogram for scalar quantity magnitudes of said sub-intervals in terms of at least one of contour lines and a color map, wherein boundary values of said sub-intervals obtained by said dividing step can be altered by a user.

9. A scalar quantity distribution display method wherein shape information of an object to be displayed having a certain shape, and scalar quantity magnitudes at a plurality of sampling points lying on said object to be displayed are used for displaying scalar quantity magnitude distribution on said object to be displayed in terms of at least one of contour lines and a color map, said scalar quantity distribution displaying method comprising the steps of:

displaying, in terms of at least one of contour lines and a color map, said scalar quantity magnitudes by a first histogram over a range which covers said scalar quantity magnitudes at all of said sampling points;

designating an arbitrary interval of said histogram;

dividing said designated interval into sub-intervals; and displaying, simultaneously with said first histogram, a second histogram for scalar quantity magnitudes of said sub-intervals in terms of at least one of contour lines and a color map, wherein said dividing step is performed so that said scalar quantity magnitude distribution may become a predetermined distribution.

* * * * *